United States Patent
Leibfried et al.

(10) Patent No.: US 8,764,127 B2
(45) Date of Patent: Jul. 1, 2014

(54) METHOD FOR CARRYING OUT AN EMERGENCY BRAKING PROCEDURE IN A VEHICLE

(75) Inventors: Oliver Leibfried, Siegelsbach (DE); Oliver Schmautz, Oberstenfeld (DE); Christian Doberschuetz, Marbach (DE); Ralph Lauxmann, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 13/505,698

(22) PCT Filed: Oct. 20, 2010

(86) PCT No.: PCT/EP2010/065763
§ 371 (c)(1),
(2), (4) Date: Jul. 19, 2012

(87) PCT Pub. No.: WO2011/054668
PCT Pub. Date: May 12, 2011

(65) Prior Publication Data
US 2012/0279814 A1    Nov. 8, 2012

(30) Foreign Application Priority Data
Nov. 3, 2009   (DE) .......................... 10 2009 046 339

(51) Int. Cl.
*B60W 20/00*    (2006.01)

(52) U.S. Cl.
USPC .......................... 303/152; 180/65.27; 303/191

(58) Field of Classification Search
USPC .................. 303/3, 15, 20, 152, 191; 318/808; 180/65.27
See application file for complete search history.

(56) References Cited

U.S. PATENT DOCUMENTS

| | | | |
|---|---|---|---|
| 3,881,141 A * | 4/1975 | Narita | 318/87 |
| 3,906,317 A * | 9/1975 | Narita | 318/246 |
| 6,384,568 B1 * | 5/2002 | Schubert | 318/808 |
| 7,597,164 B2 * | 10/2009 | Severinsky et al. | 180/65.27 |
| 2005/0200199 A1 * | 9/2005 | Kamiya et al. | 303/191 |
| 2006/0066146 A1 * | 3/2006 | Otomo | 303/151 |
| 2011/0254361 A1 * | 10/2011 | Scharmann et al. | 303/10 |

FOREIGN PATENT DOCUMENTS

| | | |
|---|---|---|
| CN | 2763145 | 3/2006 |
| CN | 101205939 | 6/2008 |
| CN | 101564998 | 10/2009 |
| DE | 10 2008 041498 | 3/2010 |
| EP | 0 982 207 | 3/2000 |
| JP | 54-93529 | 7/1979 |
| JP | 2001-10482 | 1/2001 |
| JP | 2002-171796 | 6/2002 |
| JP | 2009-12732 | 1/2009 |

* cited by examiner

*Primary Examiner* — Christopher Schwartz
(74) *Attorney, Agent, or Firm* — Kenyon & Kenyon LLP

(57) ABSTRACT

In a method for carrying out an emergency braking procedure in a vehicle, at least one electric actuator in the braking system is automatically actuated to generate an increased brake force in the case of an emergency situation. A maximum voltage, which exceeds the rated voltage of the actuator, is applied to the electric actuator.

13 Claims, 2 Drawing Sheets

METHOD FOR CARRYING OUT AN EMERGENCY BRAKING PROCEDURE IN A VEHICLE

FIELD OF THE INVENTION

The present invention relates to a method for carrying out an emergency braking procedure in a vehicle.

BACKGROUND INFORMATION

Driver assistance systems such as electronic stability programs (ESP) which, in critical situations from the driving dynamics viewpoint, automatically intervene to stabilize the vehicle are known. The possible measures taken via the driver assistance system include an intervention in the braking system of the vehicle, a main requirement for the driver assistance system being to rapidly provide a high degree of deceleration of the vehicle. In the hydraulic braking systems normally installed in vehicles, this means that a high braking pressure, which may reach the blocking pressure level of the wheels, must be built up in the shortest possible time. The pressure build-up dynamics and the maximum deceleration gradient are, however, limited by the maximum available hydraulic delivery capacity of a hydraulic pump in the brake circuit.

However, in particular in accident situations, an extremely rapid and high pressure build-up may be desirable, for which appropriately dimensioned hydraulic pumps are needed.

SUMMARY OF THE INVENTION

An object of the exemplary embodiments and/or exemplary methods of the present invention is to carry out an emergency braking procedure in a vehicle, using measures which are simple and cost-effective to carry out.

This object may be achieved according to the exemplary embodiments and/or exemplary methods of the present invention by the features described herein. The further descriptions herein specify advantageous refinements.

The method according to the present invention for carrying out an emergency braking procedure in a vehicle requires an electric actuator in the braking system which, when actuated, causes brake force to be generated in the braking system. The electric actuator is activated via control signals of a regulating or control unit, which are generated as a function of information about the surroundings and the instantaneous vehicle state. The information about the surroundings is provided either with the aid of a surroundings sensor system in the vehicle, which includes, for example, radar, lidar, or optical sensors, or is supplied to the vehicle from the outside, for example via a navigation system or via a vehicle-to-vehicle communication device. Instantaneous state variables, on the basis of which control signals for the at least one electric actuator are generated, may be ascertained with the aid of an inertial sensor system in the vehicle.

The method according to the present invention refers exclusively to an emergency braking procedure which is carried out in an emergency situation, in particular in the event of an accident that is imminent or has already occurred. In this situation, the electric actuator is activated via the control signals of the regulating or control unit to mitigate the consequences of the accident.

The emergency on which the emergency braking procedure is based is determined with the aid of the above-described sensor system or communication devices. The emergency braking procedure may also be triggered with the aid of a linkage to the deployment of another unit which characterizes an accident situation, such as, for example, the deployment of an airbag.

According to the exemplary embodiments and/or exemplary methods of the present invention it is provided that a maximum voltage exceeding the rated voltage of the actuator, which characterizes the maximum value of the electrical voltage in the actuator during regular operation, is applied to the at least one electric actuator in the braking system. The rated voltage is at least as high as, but normally higher than, the nominal electrical voltage of the actuator.

Applying a maximum voltage, which exceeds the rated voltage, to the electric actuator in the braking system results in a controlled excess current in the actuator, whereby the desired brake force build-up dynamics is achieved, i.e., both the provision of a certain brake force in the shortest possible time and the desired high brake force level. Damage to the electric actuator by the excess current and the possibility of it becoming non-operative after the application of excess current is terminated is accepted here. Due to the emergency situation, which usually involves vehicle damage anyway in the event of an accident, this consequence may, however, be accepted, since other types of damage usually exceed the damage triggered by the excess current applied to the actuator. Incidentally, the high brake force build-up dynamics may contribute to reducing the accident damage.

The excess current applied to the electric actuator in the braking system according to the present invention allows, at least once, a brief brake force build-up dynamics to be provided which otherwise may be achieved only using electric actuators of greater dimensions. Since the emergency braking procedure is a special situation, damage to the actuator due to the application of excess current is accepted. This makes the installation of actuators of greater dimensions unnecessary.

In the case of a hydraulic braking system, the electric actuator is an electric pump motor, in particular, which is installed in a hydraulic pump or drives a hydraulic pump, which applies a desired pressure to hydraulic fluid in the hydraulic brake circuit. In the emergency situation, a maximum voltage is applied to the electric pump motor, resulting in the desired increased motor output and thus in a more rapid and higher pressure build-up in the hydraulic braking system. The hydraulic delivery capacity thus achievable is significantly higher than the nominal values in the case of normal operation.

Basically, other electric actuators which directly or indirectly affect the brake force build-up dynamics may also be considered in vehicle braking systems. For example, electrically operable wedge-actuated brakes or also disk brakes having brake shoes adjustable with the help of an electric motor are possible.

In order to ensure the power supply for providing the maximum voltage, an additional energy store may be provided, which is connected in emergency braking situations. For this purpose, both an embodiment in which the system switches between the regular vehicle electrical system for voltage supply in normal situations and the additional energy store for voltage supply in emergency situations, and embodiments in which, in emergency situations, the energy store is connected to the regular vehicle electrical system, so that the voltages are added together, may be considered. Both variants offer the advantage that conventional vehicle electrical systems may be used for voltage supply, which must be supplemented only by the additional energy store for voltage supply in emergency situations.

The method for carrying out the emergency braking procedure runs in a regulating or control unit in which, as described above, the actuating signals for activating the electric actuator are generated. The regulating or control unit is installed in the vehicle and may be part of a driver assistance system in the vehicle or communicate with a driver assistance system of this type, for example with an electronic stability program (ESP). In the emergency situation, a more rapid and higher brake force build-up dynamics is automatically achieved via the driver assistance system with the aid of an excess current applied to the electric actuator.

Further advantages and advantageous embodiments are provided in the other claims, the description of the figures, and in the drawings.

BRIEF DESCRIPTIONS OF THE DRAWINGS

DETAILED DESCRIPTION

Figure 1:
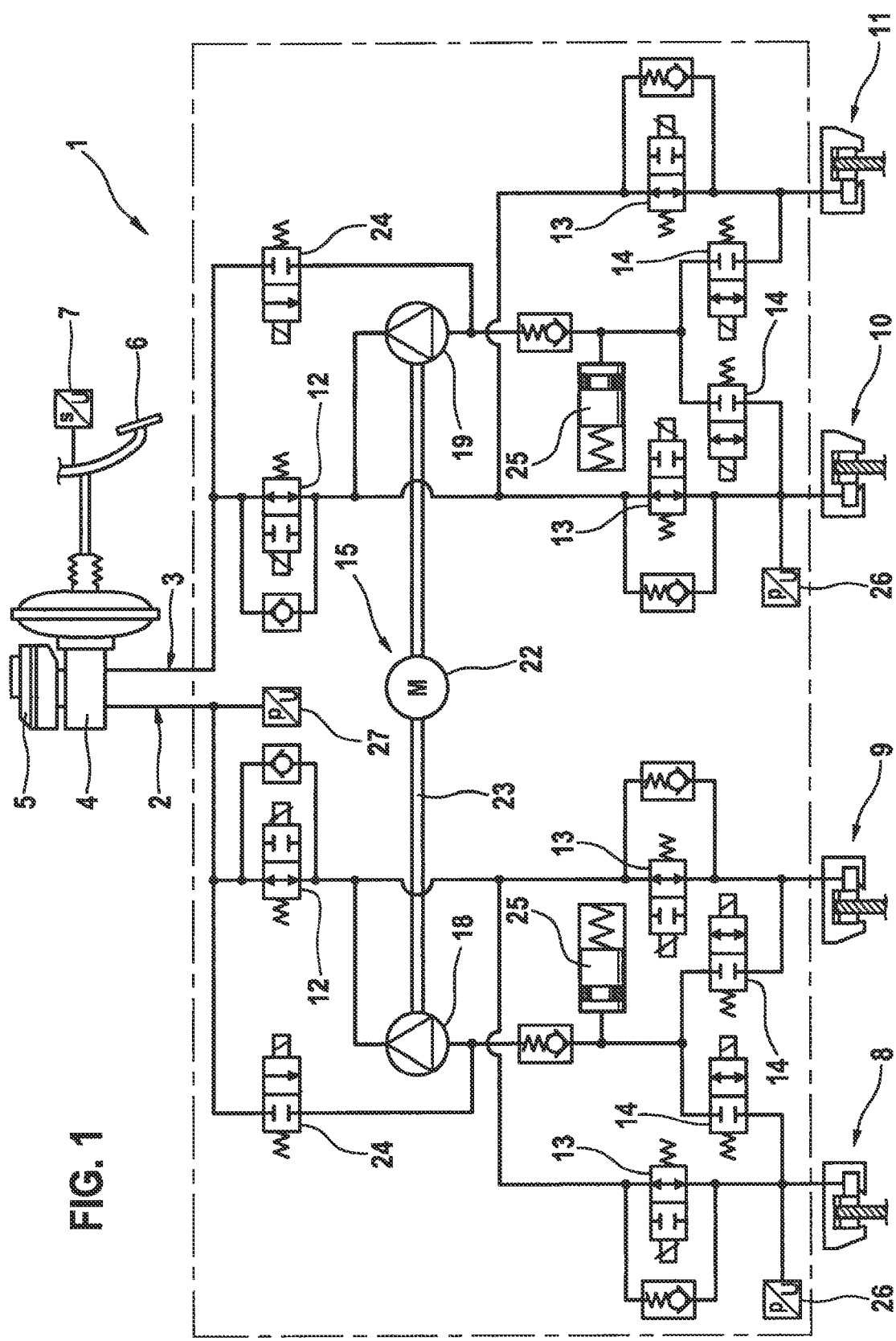
FIG. 1 shows a hydraulic circuit diagram of a vehicle braking system having a front axle brake circuit and a rear axle brake circuit, as well as an electronic stability program, which includes an electric pump unit.

The hydraulic braking system in a braking system 1, illustrated in the hydraulic circuit diagram according to FIG. 1, has a front axle brake circuit 2 and a rear axle brake circuit 3 for supplying hydraulic brake fluid to wheel brake devices 8 and 9 on the front wheels and 10 and 11 on the rear wheels. The two brake circuits 2, 3 are connected to a shared master brake cylinder 4, which is supplied with brake fluid via a brake fluid reservoir 5. Master brake cylinder 4 is operated by the driver via brake pedal 6, and the pedal travel exercised by the driver is measured with the aid of a pedal travel sensor 7.

A switchover valve 12 is situated in each brake circuit 2, 3 in the flow path between the master brake cylinder and the particular wheel brake devices 8, 9 and 10, 11. Switchover valves 12 are normally open. Each switchover valve 12 is associated with a check valve connected in parallel, through which the fluid may flow toward the particular wheel brake devices.

Between switchover valves 12 and the particular wheel brake devices 8, 9 and 10, 11, inlet valves 13 are located, which are also normally open and have check valves, through which fluid may flow in the opposite direction, i.e., from the wheel brake devices toward the master brake cylinder associated with them.

Each wheel brake device 8, 9 and 10, 11 is associated with an outlet valve 14, which is normally closed. Each outlet valve 14 is connected to the intake side of a pump unit 15, which has a pump 18, 19 in each brake circuit 2, 3. The pump unit is associated with an electrical drive, i.e., pump motor 22, which operates both pumps 18 and 19 via a shaft 23. The pressure sides of pumps 18 and 19 are connected to a line section between switchover valve 12 and the two inlet valves 13 for each brake circuit.

The intake sides of pumps 18 and 19 are each connected to a master switching valve 24, which is hydraulically connected to master brake cylinder 4. In the event of a drive dynamic regulating intervention, normally closed master switching valves 24 may be opened, so that pumps 18 and 19 aspirate hydraulic fluid directly from master brake cylinder 4. This brake pressure build-up may be carried out independently from the driver operating the braking system. Pump unit 15 having the two individual pumps 18 and 19, electric pump motor 22, and shaft 23 is part of a driver assistance system and forms an electronic stability program (ESP), in particular.

A hydraulic accumulator 25, which is located between outlet valves 14 and the intake sides of pumps 18 and 19 for each brake circuit 2, 3, is used for the temporary storage of the brake fluid which is removed, during the drive-dynamic intervention, from wheel brake devices 8, 9 and 10, 11 through outlet valves 14. Each hydraulic accumulator 25 is associated with a check valve, which opens toward the intake sides of pumps 18, 19.

For the pressure measurement, a pressure sensor 26 is located in each brake circuit 2, 3 in the area of wheel brake devices 8, 9 and 10, 11. Another pressure sensor 27 is situated in brake circuit 2 next to master brake cylinder 4.

Figure 2:
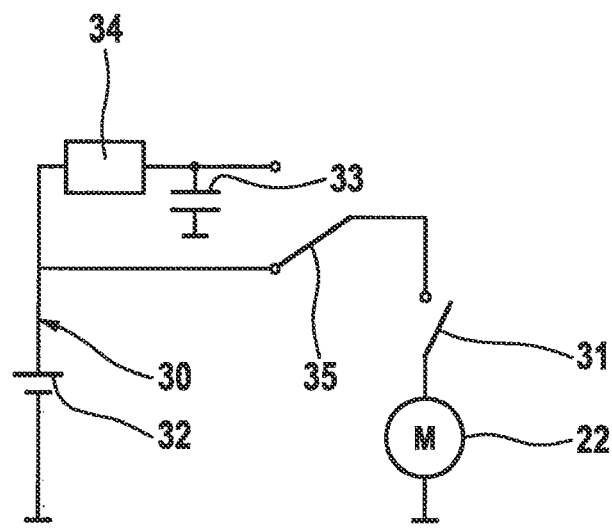
FIG. 2 shows a pump motor to which electrical voltage is supplied via the regular vehicle electrical system, an additional energy store being connectable for supplying higher voltage in emergency situations.
Figure 3:
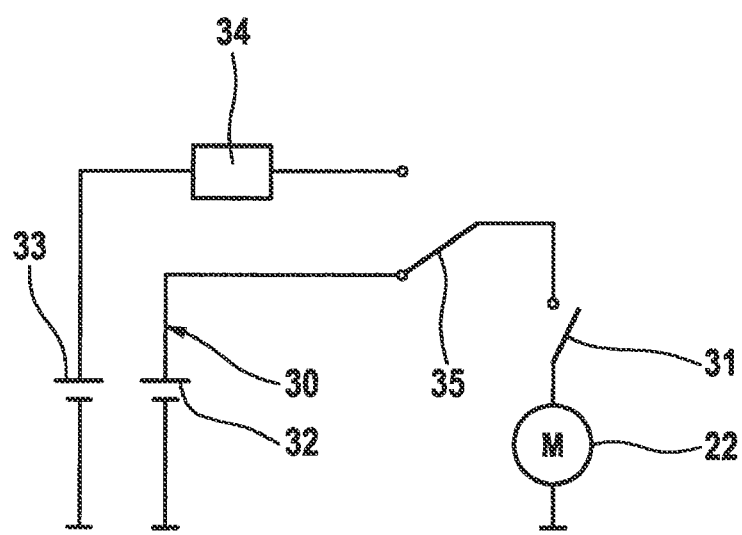
FIG. 3 shows the voltage supply to the pump motor in a further embodiment variant, in which the system may switch between the regular vehicle electrical system and the energy store for the maximum voltage.

FIGS. 2 and 3 show the voltage supply to electric pump motor 22. Normally, electric pump motor 22 is supplied with electrical nominal voltage from a vehicle battery 32 via vehicle electrical system 30. The nominal voltage is less than the rated voltage, which denotes the maximum value of the electrical voltage during normal operation. Electric pump motor 22 is associated with a switch 31, via which the pump motor is to be switched on and off.

Another switch 35 switches between the vehicle electrical system and an extension in the vehicle electrical system, in which case an electrical energy store 33, which is connected to the vehicle electrical system via a boost converter 34, is additionally connected. In the position of switch 35 which connects electrical energy store 33, a maximum voltage, which is higher than the rated voltage, is supplied to electric pump motor 22. This, however, only occurs in emergency situations, in particular in the event of an accident that is imminent or has just occurred, to achieve the supply of excess current to electric pump motor 22 and the associated higher output of the motor. This results in improved pressure build-up dynamics in the hydraulic braking system, so that a higher hydraulic pressure is established within a shorter time period.

FIG. 3 shows the voltage supply of electric pump motor 22 in one embodiment variant. Normally, electric pump motor 22 is supplied with voltage from vehicle battery 32 via vehicle electrical system 30. Energy store 33, which is associated with step-up converter 34, is designed to be independent from vehicle electrical system 30. When switch 35 switches from the vehicle electrical system to electrical energy store 33, a maximum voltage which is higher than the nominal voltage is applied to pump motor 22.

The advantage of the embodiment variant according to FIG. 3 is in the independent design of vehicle electrical system 30 and electrical energy store 33. In this embodiment variant, no modifications are needed in vehicle electrical system 30. In contrast, in the embodiment variant according to FIG. 2, electrical energy store 33 must be connected to vehicle electrical system 30; however, in the embodiment according to FIG. 2, both the vehicle's battery 32 and electrical energy store 33 may be used simultaneously for achieving the maximum voltage.

What is claimed is:

1. A method for performing an emergency braking procedure in a vehicle in the event of an emergency situation, the method comprising:
   determining an existence of an emergency state; and
   responsive to the determination of the emergency state, automatically generating an emergency vehicle brake force for braking the vehicle by switching from (a) a first voltage supply state, in which voltage from a voltage source of an vehicle electrical system, which supplies voltage to a plurality of electrical components of the vehicle, is applied to an electric actuator of a braking system to (b) a second voltage supply state, in which voltage from a supplemental electrical energy store is applied to the electric actuator;

wherein:
the supplemental electrical energy store is one of (i) connected in series with the voltage source of the vehicle electrical system and (ii) arranged on a separate line than the voltage source of the vehicle electrical system;
the voltage from the voltage source of the vehicle electrical system is within a rated voltage of the electric actuator;
when the voltage from the supplemental electrical energy store is applied to the electric actuator, the rated voltage of the actuator is exceeded; and
application of the voltage from the supplemental electrical energy store to the electric actuator is performed conditional upon that the determination that the emergency state exists is made.

2. The method of claim 1, wherein an electric motor is used as the electric actuator with the aid of which the brake force is built up.

3. The method of claim 2, wherein the electric motor drives a pump for pumping hydraulic fluid.

4. The method of claim 1, wherein the emergency state is determined via a sensor system in the vehicle, the sensor system being a surroundings sensor system.

5. The method of claim 4, wherein the surroundings sensor system includes at least one of a radar, a lidar, and an optical sensor, a navigation system, a vehicle to vehicle communication device, and an inertial sensor system in the vehicle.

6. The method of claim 1, wherein the supplemental electrical energy store is connected in series to the voltage source of the vehicle electrical system such that:
in the second voltage supply state, the voltage from the supplemental electrical energy store is combines with the voltage from the voltage source of the vehicle electrical system; and
in the first voltage supply state, the supplemental electrical energy store is bypassed such that the voltage from the voltage source of the vehicle electrical system is applied to the electric actuator without the voltage from the supplemental electrical energy store.

7. The method of claim 1, wherein the emergency state is determined on the basis of an airbag deployment.

8. The method of claim 1, wherein the supplemental electrical energy store is arranged on the separate line, such that only one of the voltage source of the vehicle electrical system and the supplemental electrical energy store is connectable at any one time for applying voltage to the electric actuator.

9. The method of claim 1, wherein the voltage level of the voltage applied to the electric actuator from the supplemental energy store is such that the application of the voltage from the supplemental energy store damages the electric actuator.

10. A braking system in a vehicle, comprising:
a regulating/control unit for performing an emergency braking procedure in the vehicle in the event of an emergency situation, the regulating/control unit including an actuating arrangement configured to:
determine an existence of an emergency state; and
responsive to the determination of the emergency state, automatically generate an emergency vehicle brake force for braking the vehicle by switching from (a) a first voltage supply state, in which voltage from a voltage source of an vehicle electrical system, which supplies voltage to a plurality of electrical components of the vehicle, is applied to an electric actuator of a braking system to (b) a second voltage supply state, in which voltage from a supplemental electrical energy store is applied to the electric actuator;

wherein:
the supplemental electrical energy store is one of (i) connected in series with the voltage source of the vehicle electrical system and (ii) arranged on a separate line than the voltage source of the vehicle electrical system;
the voltage from the voltage source of the vehicle electrical system is within a rated voltage of the electric actuator;
when the voltage from the supplemental electrical energy store is applied to the electric actuator, the rated voltage of the actuator is exceeded; and
application of the voltage from the supplemental electrical energy store to the electric actuator is performed conditional upon that the determination that the emergency state exists is made.

11. The braking system of claim 10, wherein the braking system includes a hydraulic braking system.

12. A regulating control unit for performing an emergency braking procedure in a vehicle in the event of an emergency situation, comprising:
a processing arrangement configured to determine an existence of an emergency
an actuating arrangement configured to:
determine an existence of an emergency state; and
responsive to the determination of the emergency state, automatically generate an emergency vehicle brake force for braking the vehicle by switching from (a) a first voltage supply state, in which voltage from a voltage source of an vehicle electrical system, which supplies voltage to a plurality of electrical components of the vehicle, is applied to an electric actuator of a braking system to (b) a second voltage supply state, in which voltage from a supplemental electrical energy store is applied to the electric actuator;

wherein:
the supplemental electrical energy store is one of (i) connected in series with the voltage source of the vehicle electrical system and (ii) arranged on a separate line than the voltage source of the vehicle electrical system;
the voltage from the voltage source of the vehicle electrical system is within a rated voltage of the electric actuator;
when the voltage from the supplemental electrical energy store is applied to the electric actuator, the rated voltage of the actuator is exceeded; and
application of the voltage from the supplemental electrical energy store to the electric actuator is performed conditional upon that the determination that the emergency state exists is made.

13. A driver assistance system in a vehicle, which includes an electronic stability program (ESP), comprising:
a regulating/control unit for performing an emergency braking procedure in the vehicle in the event of an emergency situation, the regulating/control unit including an actuating arrangement configured to:
determine an existence of an emergency state; and responsive to the determination of the emergency state, automatically generate an emergency vehicle brake force for braking the vehicle by switching from (a) a first voltage supply state, in which voltage from a voltage source of an vehicle electrical system, which supplies voltage to a plurality of electrical components of the vehicle, is applied to an electric actuator of a braking system to (b) a second voltage supply state, in which voltage from a supplemental electrical energy store is applied to the electric actuator;

wherein:
- the supplemental electrical energy store is one of (i) connected in series with the voltage source of the vehicle electrical system and (ii) arranged on a separate line than the voltage source of the vehicle electrical system;
- the voltage from the voltage source of the vehicle electrical system is within a rated voltage of the electric actuator;
- when the voltage from the supplemental electrical energy store is applied to the electric actuator, the rated voltage of the actuator is exceeded; and
- application of the voltage from the supplemental electrical energy store to the electric actuator is performed conditional upon that the determination that the emergency state exists is made.

* * * * *